United States Patent
Plessier et al.

(10) Patent No.: US 6,772,358 B1
(45) Date of Patent: Aug. 3, 2004

(54) SYSTEM AND METHOD FOR COORDINATING ACTIVATION OF A PLURALITY OF MODULES THROUGH THE USE OF SYNCHRONIZATION CELLS COMPRISING A LATCH AND REGULATING CIRCUITS

(75) Inventors: Bernard Plessier, Meyreuil (FR); Tien-Dung Do, Fuveau (FR)

(73) Assignee: STMicroelectroics SA, Montrouge (FR)

(*) Notice: Subject to any disclaimer, the term of this patent is extended or adjusted under 35 U.S.C. 154(b) by 0 days.

(21) Appl. No.: 09/491,327

(22) Filed: Jan. 26, 2000

(30) Foreign Application Priority Data

Jan. 28, 1999 (FR) .............................. 99 00930

(51) Int. Cl.[7] ................................. G06F 1/04
(52) U.S. Cl. ..................... 713/400; 713/600; 375/354
(58) Field of Search ................ 713/400, 600, 713/601; 716/18; 375/373, 354; 365/201

(56) References Cited

U.S. PATENT DOCUMENTS

| | | | | |
|---|---|---|---|---|
| 3,947,822 A | * | 3/1976 | Watanabe et al. | 712/245 |
| 5,034,967 A | * | 7/1991 | Cox et al. | 375/373 |
| 5,440,721 A | * | 8/1995 | Morgan et al. | 713/502 |
| 5,715,470 A | * | 2/1998 | Asano et al. | 375/341 |
| 5,818,890 A | * | 10/1998 | Ford et al. | 375/371 |
| 5,987,620 A | * | 11/1999 | Tran | 713/600 |
| 6,041,419 A | * | 3/2000 | Huang et al. | 713/401 |
| 6,301,171 B2 | * | 10/2001 | Kim et al. | 365/201 |
| 6,421,818 B1 | * | 7/2002 | Dupenloup et al. | 716/18 |

FOREIGN PATENT DOCUMENTS

| | | | |
|---|---|---|---|
| EP | 0 638 858 A1 | 8/1994 | |
| JP | 57097130 | 6/1982 | |
| JP | 60095643 | 5/1985 | |
| JP | 62191910 | 8/1987 | |
| JP | 09218888 A | * 8/1997 | ........... G06F/17/50 |

OTHER PUBLICATIONS

IBM NN931085, High Performance CMOS Off–Chip Driver Circuit with Minimal Switching Noise, IBM Technical Disclosure Bulletin, vol. 36 issue 10 pp. 85–88, Oct. 1, 1993.*
IBM NA9006441, Time–Driven CMOS Gate Placement, IBM Technical Disclosure Bulletin, vol. 33 issue 1A pp. 441–442, Jun. 1, 1990.*

* cited by examiner

*Primary Examiner*—Thomas Lee
*Assistant Examiner*—Mark Connolly
(74) *Attorney, Agent, or Firm*—Lisa K. Jorgenson; Allen, Dyer, Doppelt, Milbrath & Gilchrist, P.A.

(57) ABSTRACT

In the field of systems for the synchronization of modular electronic circuits, a system is provided for the coordinated activation of the modules. This system includes synchronization cells that have their pace set by a primary clock signal and deliver secondary clock signals controlled intermittently by the enabling signals to respectively activate the modules. The cells lock the state of each enabling signal associated with a regulator for regulating the periodicity of the change in state of each secondary clock signal and coordinating the changes in states of the secondary clock signals with one another. The system can be advantageously applied to electronic circuits having very high frequency data processing modules, especially those providing for the multiplexing of the transmissions of data carried out by each module.

30 Claims, 4 Drawing Sheets

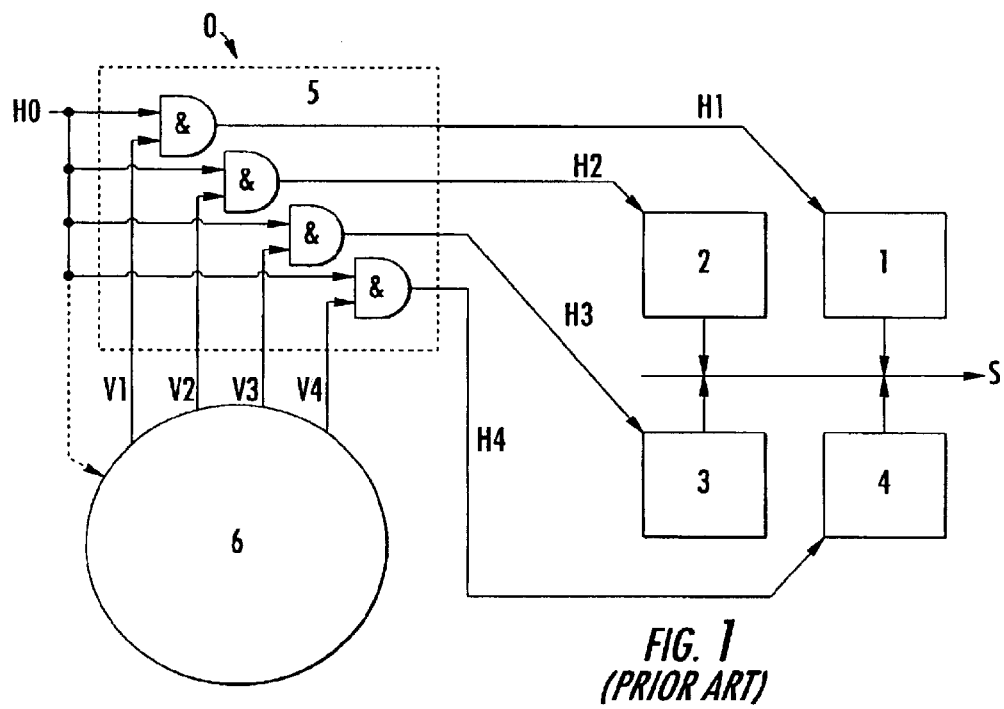
FIG. 1
*(PRIOR ART)*
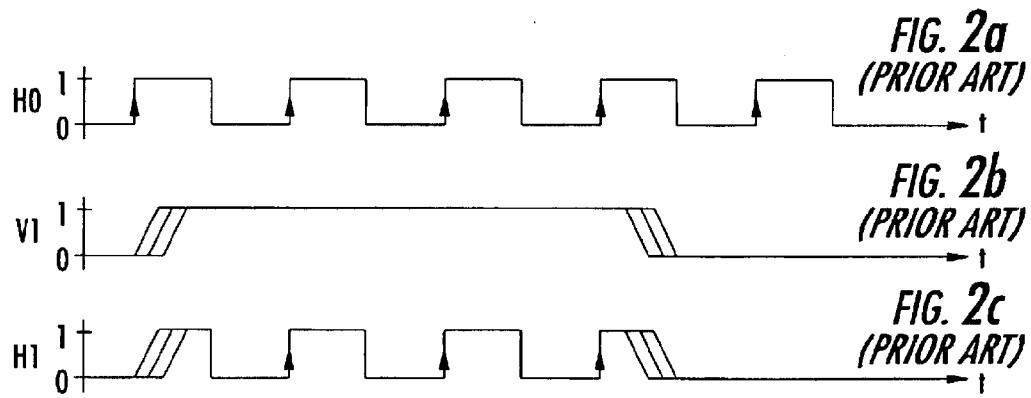
FIG. 2a
*(PRIOR ART)*
FIG. 2b
*(PRIOR ART)*
FIG. 2c
*(PRIOR ART)*

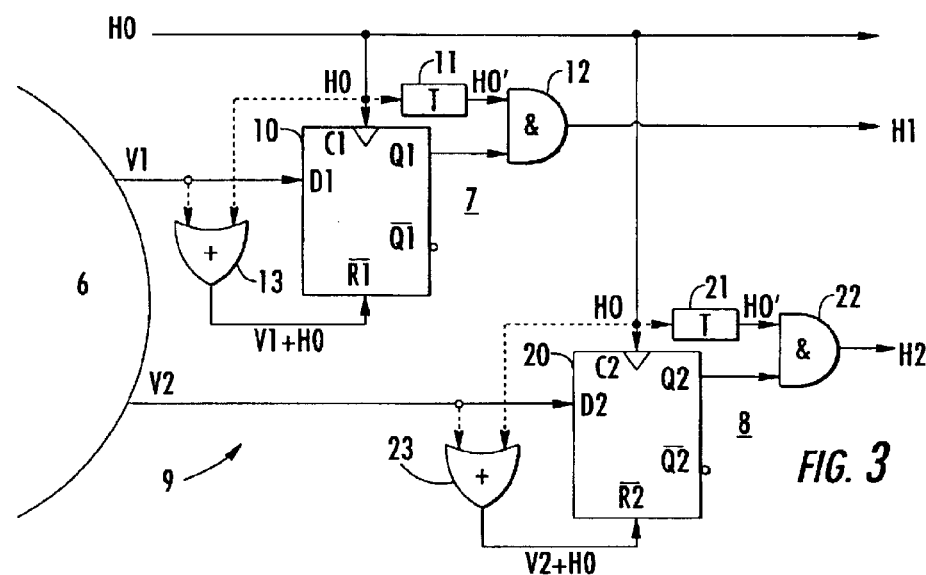
FIG. 3
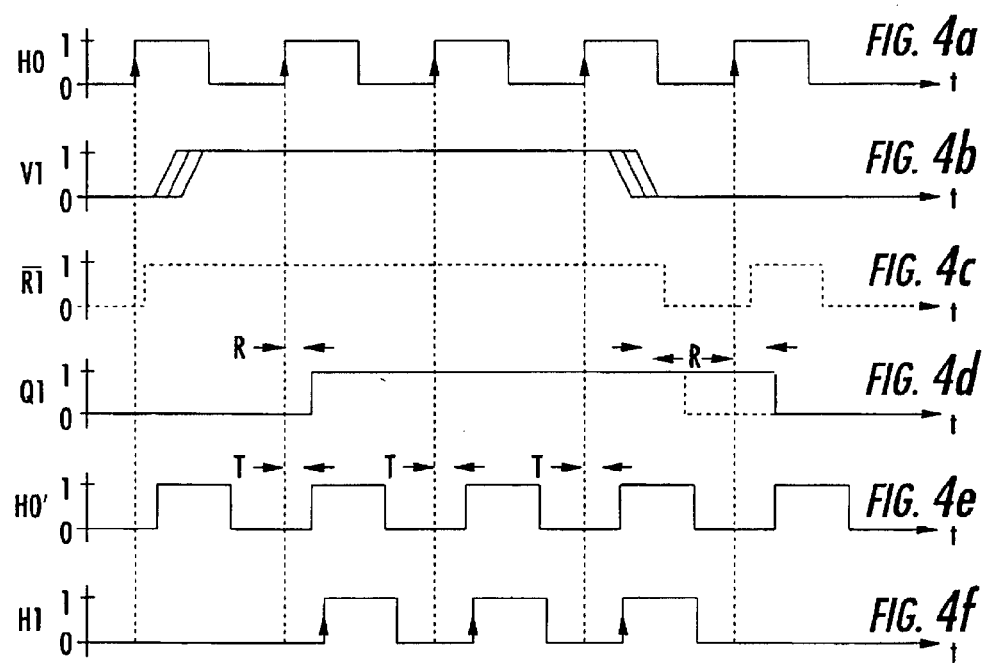
FIG. 4a
FIG. 4b
FIG. 4c
FIG. 4d
FIG. 4e
FIG. 4f

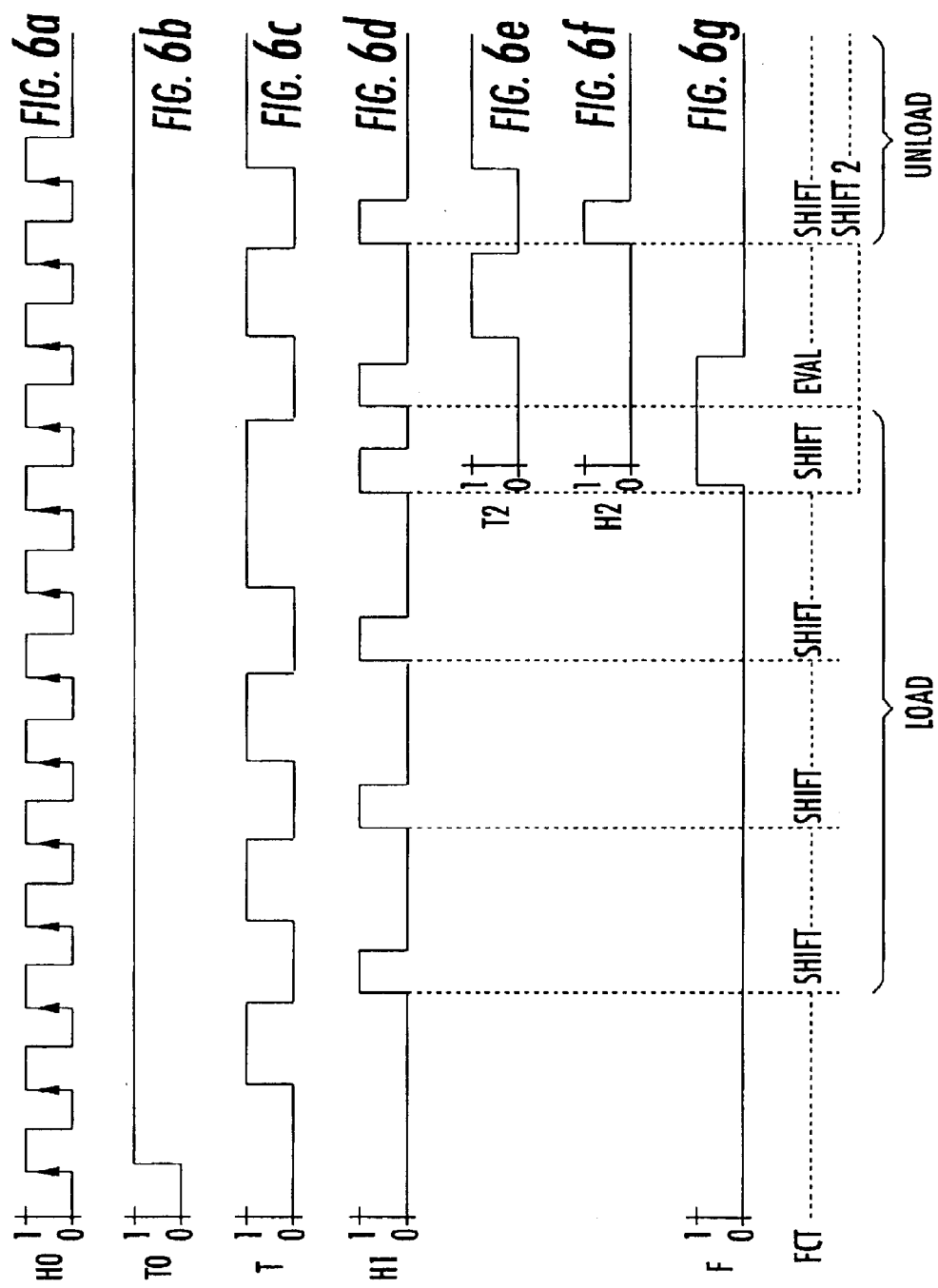

SYSTEM AND METHOD FOR COORDINATING ACTIVATION OF A PLURALITY OF MODULES THROUGH THE USE OF SYNCHRONIZATION CELLS COMPRISING A LATCH AND REGULATING CIRCUITS

FIELD OF THE INVENTION

The present invention relates to the field of electronic circuits, and, more particularly, to electronic circuits having several modules and a system of synchronization to activate each module in turn. It can be applied especially to modular circuits for the processing of high frequency digital data in which there is provision for a multiplexing of the data transmissions of each module.

BACKGROUND OF THE INVENTION

According to the prior art, there are known ways of synchronizing a modular electronic circuit by routing a common clock signal to the module that has to be activated in the corresponding multiplexing phase. This should make it possible to synchronize the transmissions of data bits coming from each module and to obtain data bits all having the same temporal width.

FIG. 1 shows a modular electronic circuit with a known type of synchronization system. The common clock signal HO is routed towards one of the modules 1, 2, 3 or 4 to be activated by a set 5 of logic gates &. Each gate & performs an AND logic operation between the clock signal HO and an enabling signal V1, V2, V3, or V4 of a respective module. The enabling signals V1, V2, V3 and V4 are given by a control unit 6.

FIGS. 2a, 2b and 2c show timing diagrams of signals of the known synchronization system of FIG. 1, the signals being respectively the primary clock signal HO, the enabling signal V1 of the module V1 and the secondary clock signal H1 applied to the input of this module 1. As illustrated, a synchronization system of this kind has the drawback of retransmitting the voltage peaks and the temporal variations in the enabling signal V1. This destroys the synchronization of the transmissions of data from the modules.

There also exist known systems of synchronization in which there is provision for shaping the enabling signals by monostable latch circuits. These systems using latch circuits again have the drawback of promoting synchronization errors because of non-compressible and erratic switch-over times, with the synchronization errors reaching delays of up to one nanosecond. The implementation of such systems in a synchronous circuit working at a frequency of over 100 MHZ gives rise to errors of synchronization amounting to more than 10% of the cycle of the clock. Such a degree of imprecision cannot be accepted in high frequency electronic circuits wherein each data bit must have a specified temporal width to prevent errors of transmission.

SUMMARY OF THE INVENTION

It is an object of the invention to provide a simple system for the synchronization of modular electronic circuits without the drawbacks of the conventional systems described above.

It is an object of the invention to ensure perfect synchronization of all the modules of an electronic circuit of this kind even at very high frequencies, namely frequencies of more than about 100 MHz.

These and other objects are achieved according to the invention by providing an electronic circuit that comprises a series of computation modules capable of the successive processing of the data elements and a control unit delivering successive enabling signals for the modules. Also included is a system for the coordinated activation of the modules comprising synchronization cells having their pace set by a primary clock signal and delivering secondary clock signals controlled intermittently by the enabling signals to respectively activate the modules. The cells include latches for latching the state of each enabling signal associated with a regulator for regulating the periodicity of the change in state of each secondary clock signal and coordinating the changes in states of the secondary clock signals with one another.

According to a first embodiment of the invention, each cell includes a latch circuit for latching a respective enabling signal synchronized by the primary clock signal, means to delay the primary clock signal in such a way as to change state subsequently to an output signal from the latch circuit, and a logic element combining the output signal from the latch circuit with the delayed primary clock signal, and delivering a respective secondary clock signal.

According to specific embodiments of the invention, the means for delaying the primary clock signal may include pairs of logic inverters, delay lines, capacitive circuits or latch circuits. They preferably introduce a delay time approximately equal to the switching time of a latch circuit.

According to preferred embodiments of the invention, each cell may further include another logic element combining the respective enabling signal with the primary clock signal and resetting the latch circuit when the signals are inactive, and/or means to select the enabling signal controlling the latch circuit from among a group of signals comprising an intermittent enabling signal delivered by the control unit and a temporary test signal delivered by a test unit.

The invention can be applied preferably to electronic circuits comprising very high frequency data-processing modules, especially circuits having a primary clock signal frequency of about 100 MHZ. The delay means then introduce transmission delays of about one nanosecond.

Each module preferably comprises an arithmetic control unit and data latching means at input and at output of the unit synchronized by a respective secondary clock signal.

The advantage of the invention is that it makes it possible to obtain perfect periodicity and perfect synchronization of the secondary clock signals applied to the modules, thus ensuring a regular pacing of a data-processing operation, especially the multiplexing of data bits.

BRIEF DESCRIPTION OF THE DRAWINGS

Other goals, characteristics and advantages of the invention shall appear from the following description and embodiments, given purely by way of an example, and while referring to the appended drawings:

FIG. 1 described above, illustrates a schematic view a modular electronic circuit with a synchronization system according to the prior art, FIGS. 2a, 2b and 2c described above, illustrate the timing diagrams of signals of the known circuit of FIG. 1, FIG. 3 illustrates two cells for the synchronization of a system for the coordinated activation of modules for modular electronic circuits according to the invention, FIGS. 4a to 4f illustrate timing diagrams of signals of a cell of FIG. 3, FIGS. 6a to 6g illustrate timing diagrams of signals of the circuit of FIG. 5.

DETAILED DESCRIPTION OF THE PREFERRED EMBODIMENTS

Figure 5:
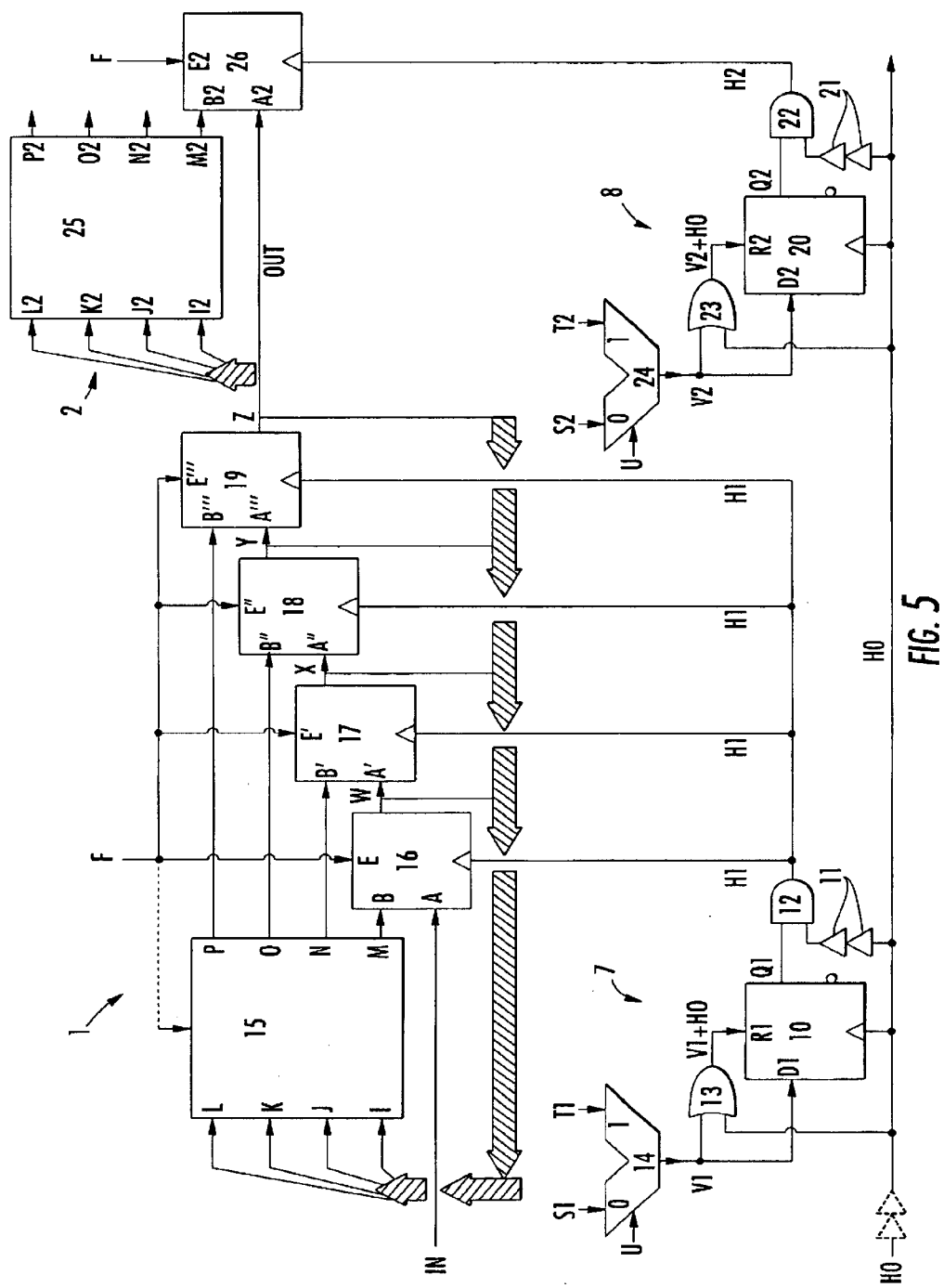
FIG. 5 illustrates the electronic circuit comprising a series of computation modules activated in a coordinated way by a system of synchronization cells according to the invention.

Hereinafter in the description of the invention, details of embodiments and operation of the system of synchronization cells will be developed first, before a description is given of its implementation in the coordinated activation of modules of an electronic circuit.

FIG. 3 shows two synchronization cells 7 and 8 of a coordinated activation system 9 according to the invention. Each cell 7 or 8 receives the primary clock signal HO at input as well as an enabling signal V1 or V2 given by the control unit 6 of the electronic circuit. Each cell 7 or 8 gives a secondary clock signal H1 or H2 at output. This signal H1 or H2 is designed respectively to activate the operation of a module 1 or 2. There is therefore a primary clock signal HO but as many cells 7, 8 and secondary clock signals H1, H2 as there are modules 1, 2 to be activated.

It is assumed here that, when the module 1 must be activated, the control unit delivers an enabling signal V1 corresponding to the active state (high state, referenced 1) and delivers a signal V1 in the inactive state (low state, referenced 0) when the module 1 must be inactivated. Each enabling signal V1 or V2 is applied to a control input D1 or D2 of a respective latch circuit 10 or 20. The latch circuits 10, 20 of the synchronization cells 7, 8 according to the invention are preferably D type synchronous data latch circuits.

Each latch circuit 10 or 20 receives the primary clock signal HO at a synchronization input C1 or C2. The changes in state of a latch circuit are therefore conditioned by the primary clock signal HO and occur, for example, after the leading edges of this signal in a specified switching time. Thus, advantageously, all the latch circuits of the synchronization system according to the invention have changes in states synchronized by one and the same clock signal HO.

The output signals Q1, Q2 of the latch circuits 10, 20 then correspond respectively to the enabling signals V1, V2 shaped and synchronized by the primary clock signal HO. In the example of the timing diagrams of FIGS. 4a, 4b and 4d, it can thus be seen that the output signal Q1 of the latch circuit 10 corresponds to the shaping of the signal V1 synchronized with the leading edges of the clock signal HO.

One alternative embodiment provides that each latch circuit 10 or 20 will be reset when the primary clock signal HO and the respective enabling signal V1 or V2 are at the inactive state (low state, referenced 0). The drawing of FIG. 3 shows for example that each enabling signal V1 or V2 is applied at input of a logic gate 13 or 23 respectively. The primary clock signal HO is applied to the other input of the logic gates 13 and 23. In this example, each gate 13 performs an OR type logic operation between the signals V1+HO, the result being applied to a resetting input non-R1 (active in the low state, 0) of the corresponding latch circuits 10.

Each synchronization cell 7 of the system 9, according to the invention, further includes a logic element 12, 22 receiving firstly the output signal Q1 of the corresponding latch circuits 10, 20 and secondly the primary clock signal HO' delayed by a delay means 11, 21. In the exemplary circuit drawing of FIG. 3, the logic elements 12, 22 are AND type logic gates. Each gate 12 or 22 has an input respectively connected to the output Q1 or Q2 (non-inverter output) of the latch circuits 10 or 20 and another input connected to the output HO' of a delay means 11 or 21.

Preferably, each delay means 11 or 21 will introduce a transmission delay T greater than or substantially equal to the switching time of the corresponding latch circuits 10, 20. Thus, each logic element 12 or 22 respectively delivers a secondary clock signal H1 or H2, which is strictly periodic, the period being that of the primary clock signal. However, the duration of each secondary clock signal H1 or H2 stretches across a temporal window corresponding to the activation of the respective enabling signal V1 or V2.

An advantage of the delay means 11, 21 is that it prevents the first "square wave pulse" of a secondary clock signal H1 or H2 from being cut short because of the state changing time of the output signal Q1 or Q2 of the latch circuits 10 or 20 respectively. Indeed, as can be seen in FIG. 4d, the output signal Q1 of the latch circuit 10 records the change in state of the enabling signal V1 with a delay time R with respect to the leading edge of the primary clock signal HO.

By delaying the clock signal HO' by a period T of the same order as this delay time R, before performing the AND logic operation between these two signals, the secondary clock signal H1 really has several square wave pulses of equal duration as can be seen in FIG. 4f. To prevent any possibility that the clock signal square wave pulse might be cut short, the period T is preferably slightly greater than the maximum delay time R of the corresponding latch circuit.

The secondary clock signals H1, H2 of a synchronization system of an electronic circuit according to the invention thus has the advantage of presenting leading and trailing edges that are perfectly spaced out in time and are therefore perfectly periodical. The delay means 11, 21 may include various embodiments.

In the preferred embodiment, one or more pairs of logic inverters are series-mounted to transmit the primary clock signal HO to the input HO' of the logic element 12 and form a delay means. The clock signal HO' thus has a timing diagram identical to that of the signal HO with a temporal shift T corresponding to the sum of the switching times of the inverters. The making of the delay means 11, 21 in the form of a pair of inverters has the advantage of being simple to lay out and of having low space requirement in an integrated circuit.

In a second alternative embodiment, the delay means is formed by a delay line before the input HO' of the logic element 12. In a third alternative embodiment, a capacitive circuit may form the delay means. The circuit typically comprises a resistor connecting the clock signal line HO to the input HO' of the logic element 12 and a capacitor connecting the input HO' with a reference potential level, for example an inactive state line 0 or the ground. The transmission period introduced by such a delay means is in the range of the time constant of the capacitive circuit (known as the "RC constant").

Finally, according to a fourth alternative embodiment, the delay means 11, 21 includes latch circuits receiving the primary clock signal HO and retransmitting it to the input HO' of each logic element 11, 22. Advantageously, should the modular electronic circuit according to the invention be made in the form of an integrated circuit, it may be planned to lay out identical latch circuits as a synchronous latch circuit 10 and as a delay means 11, thus making it possible to obtain transmission periods R and T that are strictly equal since the latch circuits are matched in one and the same layout step. Similarly, the different synchronization cells 7 and 8 of a system according to the invention are preferably made during one and the same layout step. The delay means 11 of the primary clock signal HO' may furthermore be common to several cells 7, 8 of the system 9.

The switching times R of the latch circuits 10, 20 presently fitted into integrated circuits are in the range of one nanosecond. Consequently, according to the invention, the delay means 11 will introduce transmission delays of about one nanosecond (nS).

The system of synchronization of modular electronic circuits then finds full utility in the applications wherein the clock signal has a period of less than about 10 nS. The invention advantageously makes it possible to avoid errors of synchronization which could amount to 1 nS, namely 10% of the clock period. The invention is therefore preferably implemented in a modular electronic circuit with a frequency of over 100 MHZ approximately, these circuits being called very high frequency circuits.

Thus, according to the invention the synchronization system is implemented in a very high frequency electronic circuit comprising several modules that have to process data synchronously, such as a modular circuit with a parallel or series architecture (known as a pipe-line architecture). FIG. 5 is a diagram of a modular computation electronic circuit in which arithmetic or logic operation modules 1, 2 are thus serially connected by a serial data transmission line IN, OUT. The line IN is designed to transmit the data bits one by one to the first module 1. The line OUT is designed to transmit the data bits one by one from the first module 1 to the second module 2.

The module 2 shown partially in FIG. 5 has a structure similar to the module 1 and may itself be connected to additional modules by serial transmission. The number of modules is not limited. Each module 1, 2 has a structure making it possible to: receive a data word bit by bit during a LOAD phase; then, perform an arithmetic computation or a logic operation on the data word during a evaluation cycle EVAL; and finally, carry put the bit-by-bit retransmission of a new data word resulting from the computation or operation performed on the initial data word, during an unloading phase UNLOAD.

Thus, as shown in FIG. 5, the module 1 has an arithmetic computation or logic operation unit 15 connected to the inputs or outputs of a cascade of data latch circuits 16, 17, 18, 19 of which there are four in number in the example of FIG. 5. The serial transmission line IN, through which the data bits arrive, is applied to the input A of the first latch circuits 16. The output W, X, Y or Z of each latch circuit 16, 17, 18 or 19 is applied to the input A', A", A"', etc. of the following latch circuits 17, 18, 19, etc. As for the last latch circuits 19 of the module 1, its output Z is connected to the serial transmission line OUT, through which there are output the data bits to be applied to the input A2 of the first latch circuit 26 of the next module 2.

The outputs W, X, Y and Z of the latch circuits 16–19 are thus connected in parallel and respectively to the inputs I, J, K and L of the unit 15 which performs a computation or an operation on four bits in this example. The outputs M, N, 0 and P of the unit 15 are finally looped respectively to the secondary inputs B, B', B" and B"' of the latch circuits 16, 17, 18 and 19. Indeed, latch circuits 16–19 each have two data inputs A, B and one control terminal E making it possible to select one of the two inputs A or B.

An evaluation signal F is applied to the control terminals E–E"' of all the latch circuits 16"19 to enable all the inputs A–A"' or else all the inputs B–B"'. It is assumed here that when the evaluation signal F is in the low logic state referenced 0, it enables the activation of the input A of each latch circuit 16 so long as, in the high logic state, referenced 1, it enables the activation of the input B of each latch circuits 16.

The state 0 or 1 of the evaluation signal TE therefore determines the selection/activation of the inputs A–A"' or else inputs B–B"' of the data latch circuits. Consequently, depending on the state 0 or 1 of the evaluation signal F, the elements 15, 16, 17, 18, 19 of the module 1 are interconnected in one or other of the two following ways: either the input transmission line IN is series-connected A with the cascade interconnected latch circuits W–A', X–A", Y–A"' which end in series Z with the output transmission line OUT; or the outputs M, N, 0, P of the unit 15 are connected respectively (in parallel) to the inputs B, B', B", B"' of the latch circuits 16, 17, 18, 19.

In both cases, the outputs W, X, Y, Z of the latch circuits are looped in parallel to the inputs I, J, K, L of the unit 15. As demonstrated hereinafter, the module 1 will then, depending on the state 0 or 1 of the evaluation signal F, adapt one of the following two modes of operation:

evaluation modes EVAL (F=0): the data bits W, X, Y, Z present in the memory and at output of the latch circuits 16, 17, 18, 19 are applied to the inputs I, J, K, L of the unit 15 which performs its arithmetic computation or its logic operation on these data elements and presents the result at the data outputs M, N, 0, P to be stored by the latch circuits 16, 17, 18, 19 at the following clock signal edge, shift modes SHIFT (F=1): the data bits stored are shifted form latch circuits 16, 17, 18, 19 to latch circuits 17, 18, 19, 26 with the insertion of a new bit given on the input IN and the transfer of an old bit at output OUT to another module 2, this shift being done at each clock signal edge.

The invention advantageously makes it possible to synchronize all the data latch circuits 16–19 of the module 1 by the secondary clock signal H1 given by the corresponding synchronizing cell.

The timing diagrams of FIGS. 6a to 6g illustrate the signals applied at input and exchanged between the two synchronization cells and the two circuit modules according to the invention of FIG. 5. The timing diagram 6a shows the shape of the primary clock signal HO used as a time base for the entire circuit. The timing diagrams 6b and 6c give an exemplary view of the fact that the synchronization cell is controlled by an intermittent test signal T1.

It is assumed here that the signal T1 is routed as an enabling signal V1 that controls the latch circuit 10 by a multiplexer or selector 14 controlled by a selection signal U in the state 1. A selector 14 of this kind makes it possible, if necessary, to route various signals, such as an intermittent enabling signal S1 and a provisional test signal T1, in the role of an enabling signal V1 according to the state 0, 1 of the selection input U.

FIG. 6d shows that the synchronization cell then delivers a secondary clock signal H1 whose square wave pulses are intermittent depending on the shape of the test signal or enabling signal T1, each square wave pulse however having the same temporal width as the square wave pulses of the primary clock signal HO. FIG. 6g illustrates the data transfers that then occur within the module 1 synchronized by this secondary clock signal H1. So long as the evaluation signal F is in the low state 0, the latch circuits 16, 17, 18, 19 remain cascade-connected between the input line IN and the output line OUT. At each cycle of the secondary clock signal H1, on a leading edge for example, the latch circuit 16 samples the data bit present at the input A on the series transmission line IN and then reproduces it at output W after a certain switching time. In the mean time, the next latch circuit 17 has sampled the former data bit present at output W of the latch circuits 16 and so on and so forth. The data elements sent in series on the transmission line IN are therefore stored bit by bit and shifted from latch circuit to latch circuit, at each cycle of the secondary clock signal H1.

In FIG. 6g, it can thus be seen that the four first clock signal leading edges H1 respectively prompt four data bit shifts SHIFT. A word having four data bits W, X, Y, Z is thus stored by the four latch circuits at the end of a loading phase LOAD of this kind. The module circuit 1 can then perform the arithmetic computation or logic operation on the data word W, X, Y, Z. Indeed, after the completion of the loading phase LOAD of the four bits of the data word by the latch circuits 16–19, the data word is present at the inputs I, J, K, L of the arithmetic computation or logic operation unit 15.

The unit 15 of the module 1 then performs the computation operation on a data word accurately given by the latch circuits 16–19. The computation or operation is done very swiftly by the unit 15 during the last loading cycle (LOAD), herein during the fourth secondary clock cycle H1. The result of the computation of the unit 15 is given in the form of a new data word present at the outputs M, N, 0, P.

The evaluation signal F will change its state to activate the inputs B', B" and B'" of the latch circuits 16, 17, 18, and 19 and that each latch circuit 16 will sample a respective bit of the new data word resulting from a computation of the unit 15. FIG. 6g thus shows that the signal F goes to the high state 1 after the fourth secondary clock square wave pulse H1 and remains in this state up to the end of the fifth square wave pulse H1 so that the latch circuits 16, 17, 18, 19 sample the outputs M, N, 0, P of the unit 15 during the leading edge of the fifth secondary clock signal square wave pulse H1. The fifth clock cycle H1 therefore forms an evaluation cycle EVAL of the result of computation or of operation by the module 1.

It should be noted that it is of little importance that the unit 15 should have an asynchronous operation. The unit 15 may furthermore permanently perform arithmetic computations or logic operations provided that the evaluation is done just after the complete and accurate loading of the data word. However, the unit 15 is preferably activated by the evaluation signal F (suggested by dashes in FIG. 5), hence only during the evaluation cycle EVAL in order to prevent electrical losses and unnecessary heating.

Then, the new data word is transferred between the two modules 1 and 2, again by serial shifting. To perform the shift SHIFT of the bits of the new data word at output of the module 1, the secondary clock signal H1 continues to be generated while the evaluation signal F has returned to the inactive state 0. The test signal T1 or enabling signal therefore continues to be applied to the input of the synchronization cell 7 to generate other square wave pulses H1. The test signal T1 or enabling signal is therefore intermittent in this example to generate other clock square wave pulses H1 after the fifth square wave pulse and successively shift SHIFT the four bits of the new data word.

Simultaneously, the second module 2 must perform shift operations SHIFT2 to load the four data bits respectively transmitted on the serial line OUT. As can be seen in the timing diagrams 6e to 6g during the transfer phase UNLOAD, a test signal T2 or enabling signal which is strictly identical to the test signal T1 is applied to the input of the second synchronization cell 8 to deliver a second secondary clock signal H2 that is isochronous or a first secondary clock signal H1.

Advantageously, the synchronization cells 7, 8 of the system 9 according to the invention enable the delivery of the pulses of secondary clock signals H1 and H2 that are strictly coordinated. Thus, during the transfer phase UNLOAD, all the latch circuits 16 to 19 and 26 . . . of the two modules 1 and 2 perform perfectly simultaneous shifts SHIFT and SHIFT2 of all the bits of two data words (two four-bit words, namely a shift of eight bits per eight latch circuits in this example). During this single transfer phase UNLOAD therefore, the module 1 performs an unloading of the data bits while the module 2 simultaneously loads said data bits.

It should be noted that, during the transfer phase UNLOAD of a data word between the modules 1 and 2, the module 1 may simultaneously load another data word to be ready to perform another computation as swiftly as possible. Consequently, the system with synchronization cells according to the invention enables a perfectly coordinated activation of the shift operations SHIFT and SHIFT2 of the modules 1 and 2. Advantageously, this prevents any risk of a loss of data bits.

Ultimately, the system for the coordinated activation of modules with several synchronization cells according to the invention has at least two advantages. Firstly, the invention makes it possible to obtain a situation where each secondary clock signal has square wave pulses with identical widths, hence leading and trailing edges that are perfectly periodic. Secondly, the system makes it possible to synchronize the secondary clock signals with one another, namely the changes in state of one secondary clock signal H1 occur simultaneously with the changes in state of another secondary clock signal H2.

The system of synchronizing the electronic circuit according to the invention then gives each module secondary clock signals that are perfectly periodic and synchronous. Advantageously, in such applications, the invention makes it possible both to obtain perfect periodicity of data processing by each module and to perfect synchronize the data-processing operations between the various modules.

The implementation of the system for the coordinated activation of modules according to the invention is not limited to the modular electronic circuit with the pipe-line architecture of the example of FIG. 5. The system of synchronization cells may be implemented with other architectures of modular electronic circuits, especially a circuit as shown schematically in FIG. 1 wherein the data elements transmitted by or to each module 1, 2, 3, 4 are multiplexed on the common transmission channel S', such as a single series port or parallel bus of a processor. In an application of this kind, the invention advantageously makes it possible to obtain a string of data elements whose pace is perfectly set.

Other applications, alternatives embodiments and improvements could be implemented by those skilled in the art without going beyond the scope of the present invention. The object of the protection is defined by the following claims.

That which is claimed is:

1. An electronic circuit comprising:
   a series of computation modules for successive processing of data elements;
   a control unit for delivering successive enabling signals for the modules; and
   a system for the coordinated activation of the modules and comprising a plurality of synchronization cells each receiving a primary clock signal and a respective enabling signal, each of the synchronization cells delivering a secondary clock signal controlled by the respective enabling signal to a respective module, and each of the synchronization cells comprising a latch circuit to latch a respective enabling signal; and a regulating circuit associated with the latch circuit to regulate a period of a change in state of the secondary clock signal and to coordinate changes in states of the secondary clock signals with one another.

2. An electronic circuit according to claim 1, wherein the latch circuit is synchronized by the primary clock signal, and wherein the regulating circuit comprises:

a delay device to delay the primary clock signal to change state subsequent to an output signal from the latch circuit; and a logic element to combine the output signal from the latch circuit with a delayed primary clock signal, and to deliver a respective secondary clock signal.

3. An electronic circuit according to claim 2, wherein the delay device comprises at least a pair of logic inverters.

4. An electronic circuit according to claim 2, wherein the delay device comprises a delay line.

5. An electronic circuit according to claim 2, wherein the delay device comprises a capacitive circuit.

6. An electronic circuit according to claim 2, wherein the delay device comprises at least one latch circuit.

7. An electronic circuit according to claim 2, wherein the delay device introduces transmission delay times approximately equal to a switching time of the latch circuit.

8. An electronic circuit according to claim 2, wherein the regulating circuit further comprises:

a second logic element to combine the respective enabling signal with the primary clock signal and to reset the latch circuit when at least one of the respective enabling signal and the primary clock signal are inactive.

9. An electronic circuit according to claim 1, wherein each of the synchronization cells further comprises a selector to select one of an intermittent enabling signal from the control unit and a temporary test signal from a test unit as the enabling signal to control the latch circuit.

10. An electronic circuit according claim 1, wherein each module comprises:

a computation unit comprising one of an arithmetic control unit and a logic operation unit; and data latching circuits connected to the computation unit, and being synchronized by a respective secondary clock signal.

11. An electronic circuit comprising:

a series of computation modules for processing data elements;

a control unit for delivering enabling signals for the modules; and a plurality of synchronization cells each receiving a primary clock signal and a respective enabling signal, and each of the synchronization cells delivering a secondary clock signal to a respective module, each of the synchronization cells comprising a latch circuit for a respective enabling signal and synchronized by the primary cock signal; and a regulating circuit associated with the latch circuit to synchronize changes in states of a respective secondary clock signal with other secondary clock signals, wherein the regulating circuit comprises:

a delay device to generate a delayed primary clock signal responsive to a change of a state of an output signal from the latch circuit;

a logic element to combine the output signal from the latch circuit with the delayed primary clock signal, and to deliver a respective secondary clock signal, and a second logic element to combine the respective enabling signal with the primary clock signal and to reset the latch circuit when at least one of the respective enabling signal and the primary clock signal are inactive.

12. An electronic circuit according to claim 11, wherein the delay device comprises at least a pair of logic inverters.

13. An electronic circuit according to claim 11, wherein the delay device comprises a delay line.

14. An electronic circuit according to claim 11, wherein the delay device comprises a capacitive circuit.

15. An electronic circuit according to claim 11, wherein the delay device comprises at least one latch circuit.

16. An electronic circuit according to claim 11, wherein the delay device introduces transmission delay times approximately equal to a switching time of the latch circuit.

17. An electronic circuit according to claim 11, wherein each of the synchronization cells further comprises a selector to select one of an enabling signal and a temporary test signal as a latch circuit control signal.

18. An electronic circuit according claim 11, wherein each module comprises:

a computation unit comprising one of an arithmetic control unit and a logic operation unit; and data latching circuits connected to the computation unit, and being synchronized by a respective secondary clock signal.

19. A modular very high frequency (VHF) electronic circuit comprising:

a series of modules for processing data elements, each module comprising one of an arithmetic computation unit and a logic operation unit connected to a cascade of data latch circuits;

a control unit for delivering enabling signals for the modules; and a plurality of synchronization cells each receiving a primary clock signal and a respective enabling signal, and each of the synchronization cells delivering a secondary clock signal to a respective module, each of the synchronization cells comprising a latch circuit for a respective enabling signal; and a regulating circuit associated with the latch circuit to synchronize changes in states of a respective secondary clock signal with other secondary clock signals.

20. An electronic circuit according to claim 19, wherein the latch circuit is synchronized by the primary clock signal, and wherein the regulating circuit comprises:

a delay device to generate a delayed primary clock signal responsive to a change of a state of an output signal from the latch circuit; and a logic element to combine the output signal from the latch circuit with the delayed primary clock signal, and to deliver a respective secondary clock signal.

21. An electronic circuit according to claim 20, wherein the delay device comprises at least a pair of logic inverters.

22. An electronic circuit according to claim 20, wherein the delay device comprises a delay line.

23. An electronic circuit according to claim 20, wherein the delay device comprises a capacitive circuit.

24. An electronic circuit according to claim 20, wherein the delay device comprises at least one latch circuit.

25. An electronic circuit according to claim 20, wherein the delay device introduces transmission delay times approximately equal to a switching time of the latch circuit.

26. An electronic circuit according to claim 20, wherein the regulating circuit further comprises:

a second logic element to combine the respective enabling signal with the primary clock signal and to reset the latch circuit when at least one of the respective enabling signal and the primary clock signal are inactive.

27. An electronic circuit according to claim 19, wherein each of the synchronization cells further comprises a selector to select one of an enabling signal and a temporary test signal as a latch circuit control signal.

28. A method of controlling an electronic circuit having a series of modules for processing data elements, the method comprising the steps of:

providing a primary clock signal;

generating respective enabling signals for each of the modules; and synchronizing the primary clock signal and a respective enabling signal to generate a secondary clock signal to a respective module, wherein synchronizing comprises latching a respective enabling signal with a latch circuit which is synchronized by the primary clock signal to generate an output signal, and synchronizing changes in states of a respective secondary clock signal with other secondary clock signals;

generating a delayed primary clock signal responsive to the output signal; and combining the output signal with the delayed primary clock signal to generate a respective secondary clock signal and combining the respective enabling signal with the primary clock signal to reset the latch circuit when at least one of the respective enabling signal and primary clock signal are inactive.

29. A method according to claim 28, wherein the step of generating a delayed primary clock signal comprises introducing transmission delay times approximately equal to a switching time of the latch circuit.

30. A method according to claim 28, further comprising the step of selecting one of an enabling signal and a temporary test signal as a latch circuit control signal.

* * * * *